3,083,065
STATIC LOAD BEARING HAVING PREFORMED LATERAL SUPPORT FEATURES
William L. Hinks, 1079 Washington Blvd., Cuyahoga Falls, Ohio, and Gerald D. Shook, 3014 Conlin Drive, Akron 19, Ohio
Filed Aug. 10, 1959, Ser. No. 832,726
8 Claims. (Cl. 308—237)

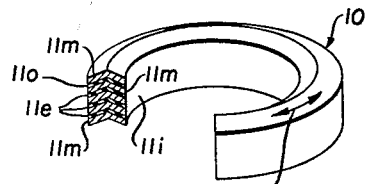
FIG. 1
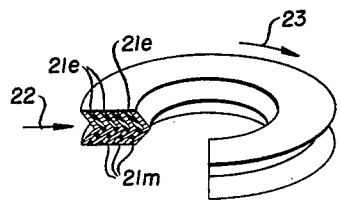
FIG. 2
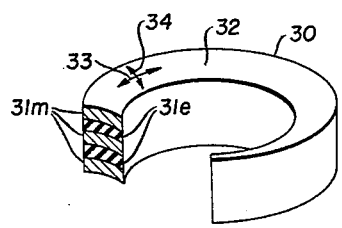
FIG. 3
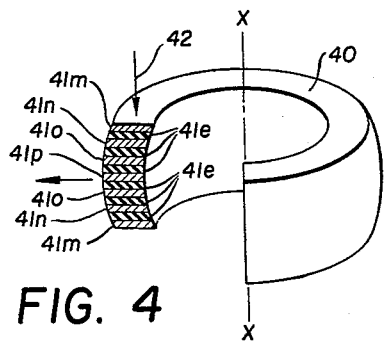
FIG. 4
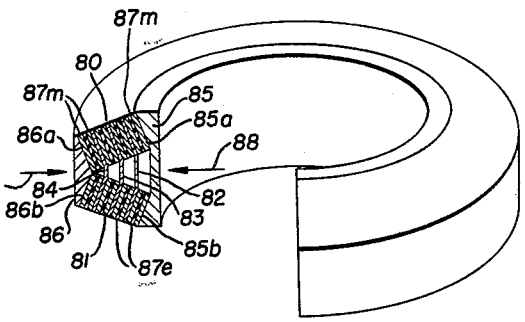
FIG. 8
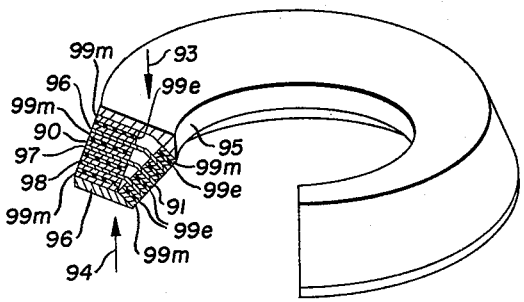
FIG. 9
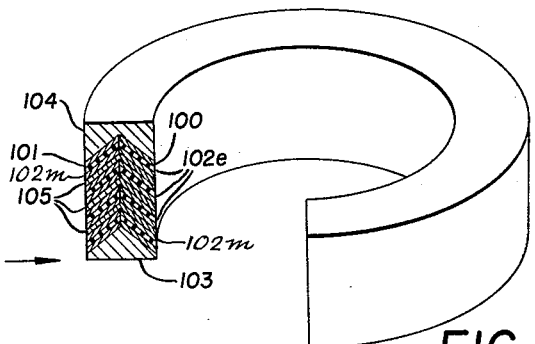
FIG. 10
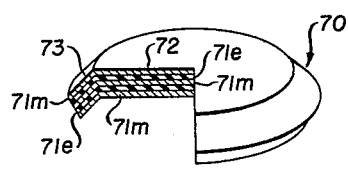
FIG. 7
FIG. 6 FIG. 5
INVENTORS
WILLIAM L. HINKS &
GERALD D. SHOOK
BY
ATTORNEY United States Patent Office 3,083,065
Patented Mar. 26, 1963

This invention relates to the art of laminated bearings and in particular has reference to improvements in a laminated bearing that is made up of a plurality of alternate layers of metal and elastomer with the bearing being intended to withstand forces applied in the direction normal to the faces of the layers while yielding to force applied in a plane common to the layers.

In the copending application of William L. Hinks, Serial No. 504,324, filed April 24, 1955, and now U.S. Patent 2,900,182, there was disclosed a laminated bearing having the above properties.

More specifically, the above referred to copending application disclosed the concept of employing alternate layers of metal and elastomer to form a laminated type of bearing. The thickness of the elastomer layer was disclosed as being such that the same was substantially incompressible to forces applied normally to the face portion of the layer. However, the elastomer layer would permit relative transverse shifting between the abutting metallic layers and in this fashion, a substantially incompressible laminated bearing was provided that would, nonetheless, yield to shear forces under certain conditions.

While the bearing of the above described copending application has been satisfactory in most respects, it has been found that the same is subject to failure under certain conditions when the total thickness of the laminated layers exceeds a certain point. More specifically, the calculations described in the above referred to copending application dictate the employment of a relatively large number of layers to obtain the minimal resistance to shearing motion, and there is often a possibility of failure due to the fact that the loads applied normal to the layers will tend to buckle or collapse the same intermediate its ends. In the above referred to copending application, some concern was given to the solution of this problem and there was disclosed the concept of surrounding the laminated bearing with a resilient sleeve that was, in turn, surrounded by a radially inextensible metallic sleeve. This had the desired effect of limiting to a certain extent the amount of radial movement but it has been found that the same was disadvantageous in that it restricted the normal transverse shifting that occurred during the application of torsion loads. Thus, while the means disclosed in the copending application solved one existant problem, they inherently created another problem due to the restricting force created by said means against torsional movement, for example.

In general, the requirement for lateral support of some laminated static load bearings results from the particular dimensions or dimensional ratios that they have in relation to the force applied normal to the layers. The height of the laminate stack in relation to the significant width dimensions of the layers is an important rough parameter that is associated with the question of lateral instability.

The application of force on the bearing normal to the plane of the layers causes a tendency for the mid-layers to bulge out from under the load because of a phenomenon that is analogous to the well-known instability of overloaded structural columns. Basically, a fraction of the normal force applied to a given metal layer, or to a set of layers is converted into a lateral force acting in the plane of the layers urging them to move transversely against the shear resistance of the elastomer layers flanking them. This lateral force comes about because of the occurrence of an extremely small angle or non-parallel condition between adjacent metal layers or between groups of layers within the bearing. This small lack of parallelism may be due to manufacturing inaccuracies or to uneven load distribution over the area of the bearing which would tend to compress one side of the bearing more than the other. Although the bearing is substantially no more compressible than the reduction in volume of the elastomer will allow, this very small amount may result in the lack of parallelism cited. The effect is generally cumulative; the farther said lateral force has caused the mid-layers to bulge out, the greater said force becomes. The "taller" that a laminated bearing is, the greater the non-parallel effect may be for a given applied load, and therefore, the greater the developed unstable lateral force with respect to the shear resistance of the elastomer layers. If said shear resistance is inadequate to inherently limit the lateral displacement, said displacement or bulging will continue to failure of the bearing.

It has been discovered that the above mentioned disadvantages can be obviated by preforming the layers into specific shapes that provide inserent resistance to uncontrolled shifting during the application of shear force. More specifically, the improvement herein contemplated envisions the use of the layers themselves for the purpose of preventing such uncontrolled shifting, with the metallic layers being contoured so as to oppose such shifting as will be more fully described in the ensuing paragraphs.

It, accordingly, becomes a principal object of this invention to provide an improved laminated bearing made up of alternate layers of metal and elastomer, with the layers being preformed to resist uncontrolled shifting during the application of shear force.

These and other objects of the invention will become more apparent upon a reading of the following brief specification, considered and interpreted in the light of the accompanying drawings.

Of the drawings:

FIGURE 1 is a perspective view of a bearing having the features of the invention.

FIGURES 2 through 4 and 7 through 10 are perspective views of modified forms of the invention.

FIGURES 5 and 6 are sectional views of a modified form of the invention.

Referring now to the drawings and in particular to FIGURE 1 thereof, the improved bearing, generally designated by the numeral 10, is shown made up of a plurality of alternate layers of rubber and elastomer, with the thickness of the layers being exaggerated for the sake of clarity and with the numerals 11m indicating the metal layers, while the numerals 11e indicate the interleaved elastomer layers. As best shown in FIGURE 1, each layer 11m is chevron shaped in transverse cross-section and includes inner peripheral edges 11i and outer peripheral edges 11o. The interleaved elastomer layers 11e, 11e are of conforming cross-sectional configuration so that the entire bearing presents a chevron shaped cross-section as is clearly evident from FIGURE 1.

The effect of the chevron shaped arrangement above discussed is that uncontrolled shear is prevented by virtue of the preformed nature of the metallic layers 11m, 11m. Specifically, if there is a tendency of the surface 11o to be moved to the left of FIGURE 1, this shear force is resisted by the remaining portion of the layer. Thus, in effect, there is a situation where the various surfaces making up the elastomer layer, cooperating with the various surfaces of the metallic layer, cancel each other out so that at all times uncontrolled shear is prevented.

In this fashion, the bearing can absorb axial loads and will resist uncontrolled shear in a radial direction. The bearing will, however, yield to torsion forces applied in the direction of arrow 13.

The modified form of the invention shown in FIGURE 2 is similar to that shown in FIGURE 1, with the single exception that the chevron shaped metallic layers 21m, 21m are arranged at right angles to the position shown in FIGURE 1. Again, elastomer layers 21e, 21e are interposed between metallic layers 21m, 21m for the purposes of permitting the bearing to absorb radial forces in the direction of arrow 22, while yielding to torsion forces applied in the direction of the arrow 23.

In the modified form of the invention shown in FIGURE 3, there is again disclosed a laminated bearing 30 that is made up of a plurality of metallic layers 31m, 31m between which are interposed elastomer layers 31e, 31e, with the layers 31m and 31e again being exaggerated in thickness for the purpose of clarity. In this form of the invention, the exposed surfaces 32, 32 of the members 31m, 31m are preferably arcuate in cross-sectional contour, but are reverse in arc to the surfaces required in a spherical bearing. Thus, these surfaces cannot receive a sphere and, accordingly, only torsional force in the direction of the arrow 33 is possible. Accordingly, there is a situation where the preformed, reverse contour, cross-sectional configuration of each metallic layer 31m serves to provide opposed faces that balance each other out so that a force exerted in one radial direction will be opposed by the opposite component of the metallic layer that is disposed 180 degrees from the point of shear force application.

The species of the invention shown in FIGURES 1 through 3 of the drawings have illustrated laminated bearings wherein the peripheral edge surfaces are aligned in a straight line and where the metallic layers have been contoured between the edges to provide resistance to uncontrolled shifting during shear.

In FIGURES 4 through 6 of the drawings, the equivalent effect is obtained with the use of flat discs that are not contoured in cross-section but which are of varying radial dimension so as to provide a high resistance to shear in the critical region of the bearing.

More specifically, and referring to FIGURE 4, it will be noted that the laminated bearing 40 is made up of a plurality of metallic discs arranged about a common axis X, X and having interposed therebetween a plurality of elastomer layers. For the purposes of description, the bearing 40 will be described as being made up of four different diameter metallic discs 41m, 41n, 41o and 41p, with the disc 41p being centrally located, while the discs 41m, 41n and 41o are located in opposed fashion on opposite sides of the disc 41p. The elastomer layers interposed between the just described metallic discs are designated by the numeral 41e. Thus, in this fashion, a load applied in the direction of the arrow 42, for example, will be resisted by a larger elastomer to metal bond in the disc 41p than will be the case in the disc 41m, accordingly, the offsetting of the disc 41m as just described serves to provide maximum shear resistance at the critical location.

Similarly, in FIGURE 5, the bearing 50 is made up of metallic layers 51m, 51m and interleaved elastomer layers 51e, 51e that again vary in diameter but which have a common outer diameter 52, while a convex inner diameter 53 is provided by the varying radial dimension of the discs 51m, 51m and 51e, 51e.

In FIGURE 6, the reverse situation from FIGURE 5 is illustrated, with the bearing 60 being made up of metallic discs 61m, 61m between which are imposed elastomer discs 61e, 61e. Again a constant inner diameter 62 is provided while a convex external diameter is shown in the modification of the invention.

The modified form of the invention shown in FIGURE 7, shows the bearing 70 again made up of a plurality of metallic layers 71m, 71m between which are interposed elastomer layers 71e and 71e. Each layer 71m includes a circular central portion 72, as well as a down turned peripheral flange portion 73. In this fashion, opposed portions of each flange 73 will resist shear by virtue of their preformed configuration which provides opposing surfaces that balance each other out under the application of shear forces.

The modifications shown in FIGURES 8, 9 and 10 of the drawings have to do with bearings wherein a plurality of bearing units are assembled for coaction with each other.

Accordingly, in FIGURE 8, bearing units 80 and 81 are connected by contoured support rings 82, 83 and 84, with end ring 85 having surfaces 85a and 85b that are complementally engaged with the top portions of the bearings 80 and 81, respectively. An encircling opposed end ring 86 similarly has surfaces 86a and 86b that engage the opposed ends of the bearings.

As before, each bearing unit 80 and 81 includes metallic layers 87m and 87m between which are interposed elastomer layers 87e, 87e. It is believed manifest from FIGURE 8 that the support rings 82, 83 and 84 are contoured so as to be interleaved between the just described layers of the bearings 80 and 81, as is clearly shown in FIGURE 8 of the drawings.

In this fashion, the bearing will absorb forces in the direction of the arrows 88 and 89. Because of the canted angle of one laminate stack 80 with respect to the other 81 and the tie rings 82, 83 and 84 between, one laminate stack could not move laterally without necessarily compressing the other, which would be impossible; hence the entire unit is laterally stable.

A similar arrangement is shown in FIGURE 9 of the drawings, with the exception that the bearings 90 and 91 are designed to absorb axially applied loads in the direction of the arrows 93 and 94, for example. Again, rings 95 and 96 have contoured surfaces that bear against the opposed ends of the bearings 90 and 91, while support rings 96, 97 and 98 are interleaved between the metallic layers 99m, 99m of bearings 90 and 91 so as to achieve the desired balancing out of shear forces. As before, elastomer layers 99e are employed in the bearings 90 and 91 between the metal layers 99m, 99m.

The modified form of the invention shown in FIGURE 10 is, in effect, somewhat similar to that shown in FIGURE 1 of the drawings, with the exception that the same is made up of two independent bearing units 100 and 101, with each unit 100 and 101 having metallic layers 102m, 102m and elastomer layers 102e, 102e. Rings 103 and 104 have complemental surfaces that bear against the opposed ends of bearings as shown in FIGURE 10. Preferably, V or chevron shaped rings 105, 105 are interleaved between the layers of bearings 100 and 101 to structurally interconnect the same.

In FIGURE 10, as in FIGURES 8 and 9, it is believed apparent that if a shear force is exerting itself radially outwardly of the left hand portion of the bearing 101 that this force will be opposed by the bearing 100, at a point disposed 180 degrees from this point where the maximum shear force is being obtained. The presence of the second bearing will thus balance out the forces acting on the first bearing so that no uncontrolled shifting will occur.

It will be seen from the foregoing that there has been provided a new and improved type of laminated bearing that is characterized by the fact that the component layers thereof are preformed to a contour that will effectuate balancing out of any unequally applied shear forces.

It has been shown how uncontrolled shear is obviated by virtue of these opposed portions acting against each other by virtue of their preformed nature.

It has also been shown how the use of a plurality of bearings can be employed to even further effectuate a complete balancing out of forces involved, especially if the bearings involved are interconnected by preformed components.

While a full and complete description of the invention has been set forth in accordance with the dictates of the patent statutes, it is to be understood that the invention is not intended to be so limited.

It is also to be understood that all thickness of layers shown in the drawings have been greatly exaggerated for the sake of clarity of description. Thus, where the drawings show three metallic layers and two elastomer layers, for example, it is to be understood that, in actual practice, a far greater number of such layers will be employed than the height shown with the number of layers calculated in the manner set forth in applicant's copending application Serial No. 504,324.

Similarly, while all forms of the invention have been illustrated in connection with an axis of rotation, it is to be understood that this is not mandatory, since the principles of the invention are equally applicable in any instance where compression and shear forces are involved.

Similarly, where the terms "metal" and "elastomer" are employed, it is to be understood that equivalents could be utilized. Also, the bearings employed could, in most instances, be selectively arranged around an axis to absorb either radial loads or axial loads, or a combination of both, if desired.

This application is a continuation-in-part of the application of William L. Hinks, Serial No. 504,324, filed April 24, 1955 and now U.S. Patent 2,900,182.

What is claimed is:

1. A laminated bearing of the character described, comprising; alternate layers of metal and elastomer each having longitudinal and transverse dimensions and being bonded to each other in aligned overlying relationship with each such elastomer layer being of substantially incompressible thickness, whereby said entire bearing will be substantially incompressible to forces applied normal to said layers while yielding to forces applied in a direction normal to the thickness dimension of said layers; and support means, defined by said metal layers and controlling transverse shifting of said layers towards unaligned relationship with each other while simultaneously affording minimal resistance to longitudinal shifting of said layers in said aligned overlying relationship.

2. A laminated bearing of the character described, comprising; alternate layers of metal and elastomer each having longitudinal and transverse dimensions and being bonded to each other in aligned overlying relationship with each such elastomer layer being of substantially incompressible thickness, whereby said entire bearing will be substantially incompressible to forces applied normal to said layers while yielding to forces applied in a direction normal to the thickness dimension of said layers; said metal layers being contoured to control transverse shifting of said layers towards unaligned relationship with each other while simultaneously affording minimal resistance to longitudinal shifting of said layers in said aligned overlying relationship.

3. The device of claim 2 further characterized by the fact that said metal layers include a plurality of surfaces disposed at an angle with respect to each other.

4. A laminated bearing of the character described, comprising; alternate layers of metal and elastomer each having longitudinal and transverse dimensions and being arranged concentrically around an axis of rotation and bonded to each other in aligned overlying relationship with each such elastomer layer being of substantially incompressible thickness, whereby said entire bearing will be substantially incompressible to forces applied normal to said layers while yielding to forces applied in a direction normal to the thickness dimension of said layers; said layers being concavo-convex in transverse cross-sectional configuration, whereby transverse shifting of said layers out of said concentrically arranged condition is resisted.

5. A laminated bearing of the character described, comprising; alternate layers of metal and elastomer arranged concentrically around an axis of rotation and bonded to each other in aligned overlying relationship with each such elastomer layer being of substantially incompressible thickness, whereby said entire bearing will be substantially incompressible to forces applied normal to said layers while yielding to forces applied in a direction normal to the thickness dimension of said layers; said layers being successively graduated in diameter between the minimum and maximum diameters of said bearings.

6. A laminated bearing of the character described, comprising; alternate layers of metal and elastomer arranged concentrically around an axis of rotation and bonded to each other in aligned overlying relationship with each such elastomer layer being of substantially incompressible thickness, whereby said entire bearing will be substantially incompressible to forces applied normal to said layers while yielding to forces applied in a direction normal to the thickness dimension of said layers; said layers each including a flat central portion and a peripheral flange portion disposed at an angle with respect to said central portion.

7. A laminated bearing of the character described, comprising; a first laminated bearing unit including alternate layers of metal and elastomer bonded to each other in aligned overlying relationship with each such elastomer layer being of substantially incompressible thickness, whereby said first bearing will be substantially incompressible to forces applied normal to said layers while yielding to forces applied normal to the thickness dimension of said layers; a second laminate bearing unit including alternate layers of metal and elastomer bonded to each other in aligned overlying relationship with each such elastomer layer being of substantially incompressible thickness, whereby said second bearing unit will be substantially incompressible to forces applied normal to said layers; said first and second bearing units being concentrically disposed about a common axis of rotation; said layers of said first bearing unit being inclined at a different angle with respect to said axis of rotation than said layers of said second bearing unit whereby said surfaces will balance each other during the application of load forces to said bearing unit; said first and second bearing units reciprocally resisting the radial deformation tendencies of each other.

8. The device of claim 7 further characterized by the presence of at least one support plate interconnecting said first and second bearing units and being interleaved between the layers thereof.

References Cited in the file of this patent

UNITED STATES PATENTS

| | | |
|---|---|---|
| 1,892,065 | Markey | Dec. 27, 1932 |
| 2,187,156 | Johnson | Jan. 16, 1940 |
| 2,553,636 | Dath | May 22, 1951 |
| 2,759,759 | Blackwood | Aug. 21, 1956 |
| 2,900,182 | Hinks | Aug. 18, 1959 |